US008176347B1

(12) United States Patent
Gaskins et al.

(10) Patent No.: US 8,176,347 B1
(45) Date of Patent: May 8, 2012

(54) MICROPROCESSOR THAT PERFORMS ADAPTIVE POWER THROTTLING

(75) Inventors: Darius D. Gaskins, Austin, TX (US); Stephan Gaskins, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 0 days.

(21) Appl. No.: 13/371,626

(22) Filed: Feb. 13, 2012

Related U.S. Application Data

(63) Continuation of application No. 12/403,195, filed on Mar. 12, 2009, now Pat. No. 8,135,970.

(60) Provisional application No. 61/158,019, filed on Mar. 6, 2009.

(51) Int. Cl.
*G06F 1/00* (2006.01)
(52) U.S. Cl. ........................ 713/322; 713/300
(58) Field of Classification Search .................. 713/300, 713/310, 322, 323, 340
See application file for complete search history.

(56) References Cited

U.S. PATENT DOCUMENTS

| | | | | |
|---|---|---|---|---|
| 4,569,589 A * | 2/1986 | Neufeld | ........................... | 356/39 |
| 4,591,841 A * | 5/1986 | Gunderson et al. | ........... | 345/180 |
| 4,615,014 A * | 9/1986 | Gigandet et al. | .............. | 702/176 |
| 6,651,176 B1 | 11/2003 | Soltis, Jr. et al. | | |
| 6,802,015 B2 * | 10/2004 | Atkinson | ...................... | 713/322 |
| 6,813,719 B2 * | 11/2004 | Athas | ........................... | 713/320 |
| 6,966,008 B2 * | 11/2005 | Athas | ........................... | 713/320 |
| 7,171,570 B2 * | 1/2007 | Cox et al. | ...................... | 713/300 |
| 7,178,043 B2 * | 2/2007 | Nakazato | ...................... | 713/300 |
| 7,315,626 B2 * | 1/2008 | Pedersen | ...................... | 381/323 |
| 7,340,622 B2 * | 3/2008 | Cox et al. | ...................... | 713/300 |
| 7,360,101 B2 * | 4/2008 | Kang | ........................... | 713/300 |
| 7,451,333 B2 | 11/2008 | Naveh et al. | | |
| 7,562,234 B2 * | 7/2009 | Conroy et al. | ................ | 713/300 |
| 7,689,846 B1 * | 3/2010 | Athas | ........................... | 713/322 |
| 7,818,596 B2 * | 10/2010 | Fenger et al. | ................ | 713/322 |
| 8,010,824 B2 * | 8/2011 | Naffziger | ...................... | 713/340 |
| 2003/0188210 A1 | 10/2003 | Nakazato | | |
| 2007/0050646 A1 | 3/2007 | Conroy et al. | | |
| 2007/0260897 A1 | 11/2007 | Cochran et al. | | |
| 2009/0119523 A1 * | 5/2009 | Totten | ........................... | 713/322 |
| 2010/0049997 A1 * | 2/2010 | Tu | ................................. | 713/300 |
| 2010/0229012 A1 | 9/2010 | Gaskins et al. | | |

(Continued)

OTHER PUBLICATIONS

Subramanian et al. Conjoined Pipeline: Enhancing Hardware Reliability and Performance Through Organized Pipeline Redundancy. 2008 14th IEEE Pacific Rim International Symposium on Dependable Computing. 2008.*

(Continued)

*Primary Examiner* — Matthew D Spittle
(74) *Attorney, Agent, or Firm* — E. Alan Davis; James W. Huffman (57) ABSTRACT

A microprocessor that performs adaptive power throttling includes a calculation unit configured to calculate an average power consumed by the microprocessor over a most recent predetermined sample time and to determine whether the average power is less than a predetermined maximum power value. A power management unit controls the microprocessor to conditionally operate at a predetermined frequency if the average power is less than the predetermined maximum power value. The predetermined frequency is a frequency at which the microprocessor may consume more than the predetermined maximum power value. The power management unit controls the microprocessor to operate at the predetermined frequency only if the microprocessor was most recently instructed by system software to operate at a highest frequency instructable by the system software. The highest frequency instructable by the system software is less than the predetermined frequency.

20 Claims, 4 Drawing Sheets

U.S. PATENT DOCUMENTS

| | | | |
|---|---|---|---|
| 2011/0022868 A1* | 1/2011 | Harchol-Balter et al. | .... 713/323 |
| 2012/0005514 A1 | 1/2012 | Henry et al. | |
| 2012/0047377 A1 | 2/2012 | Henry et al. | |
| 2012/0047385 A1 | 2/2012 | Henry et al. | |

OTHER PUBLICATIONS

Maekinen, Sami. CPU & GPU Overclocking Guide. ATI Technologies, Inc. 2006.*

ASRock. Turbo 50—50% Performance Boost Up. Product Release. Jan. 29, 2010.*

Semin, Andrey. Inside Intel Nehalem Microarchitecture. Slideshow. The Eighth Annual Meeting on High Performance Computing and Infrastructure in Norway. May 18-20, 2009.*

Ung, Gordon Mah. "Everything You Need to Know About Nehalem 'Turbo Mode'" Published on Maximum PC (http://www.maximumpc.com), Aug. 22, 2008; downloaded Jun. 10, 2010 from http://www.maximumpc.com/article/features/everything_you_need_know_about_nehalems_turbo_mode. pp. 1-2.

Liu, Yongpan et al. "Accurate Temperature-Dependent Integrated Circuit Leakage Power Estimation is Easy." Proceedings of the Conference on Design, Automation and Test in Europe (Nice, France, Apr. 16-20, 2007). Design, Automation, and Test in Europe. EDA Consortium, San Jose, CA pp. 1526-1531.

Isci, Canturk et al. "An Analysis of Efficient Multi-Core Global Power Management Policies: Maximizing Performance for a Given Power Budget." Proc. Intl (Symp. Microarch.) (MICRO) 2006, pp. 347-358.

Su, Haihua et al. "Full Chip Leakage Estimation Considering Power Supply and Temperature Variations." ISLPED '03, Aug. 25-27, 2003, Seoul, Korea. pp. 78-83.

Naveh, Alon et al. "Power and Thermal Management in the Intel® Core™ Duo Processor." Intel Technology Journal, vol. 10, Issue 2, May 15, 2006. pp. 109-122.

Rubio et al. "Dynamic Processor Overclocking for Improving Performance of Power-Constrainted Systems." IBM Research Report. Jul. 14, 2005. pp. 1-20.

Sasikala, D. et al. "Processor Performance Enhancement Using Self-Adaptive Clock Frequency." International Journal of Computer Applications. vol. 3. No. 11 Jul. 2010. pp. 19-26.

Intel Corporation. "Intel® Turbo Boost Technology in Intel® Core™ Microarchitecture (Nehalem) Based Processors." White Paper. Nov. 2008. pp. 1-12.

* cited by examiner

Fig. 4 assumptions: P = 100, D = 10

| counter value | 9 | 10 | 2 | 2 | 8 | 8 | 20 | 16 | 14 |
|---|---|---|---|---|---|---|---|---|---|
| circular queue of bins | | 9 | 10 | 2 | 2 | 8 | 8 | 20 | 16 |
| | | 10 | 9 | 10 | 2 | 2 | 8 | 8 | 20 |
| | | 10 | 10 | 9 | 10 | 2 | 2 | 8 | 8 |
| | | 10 | 10 | 10 | 9 | 10 | 2 | 2 | 8 |
| | | 9 | 10 | 10 | 10 | 9 | 10 | 2 | 2 |
| | | 3 | 9 | 10 | 10 | 10 | 9 | 10 | 2 |
| | | 12 | 3 | 9 | 10 | 10 | 10 | 9 | 10 |
| | | 12 | 12 | 3 | 9 | 10 | 10 | 10 | 9 |
| | | 11 | 12 | 12 | 3 | 9 | 10 | 10 | 10 |
| | | 6 | 11 | 12 | 12 | 3 | 9 | 10 | 10 |
| A | | 92 | 96 | 87 | 77 | 73 | 78 | 89 | 95 |
| event | | | OS: to Xp-4 | end bin duration | OS: to Xp-1 | end bin duration | OS: to Xp | end bin duration | end bin duration |
| X | Xp | Xp-4 | Xp-4 | Xp-1 | Xp-1 | Xp+2 | Xp+1 | Xp | initial conditions ─
obey OS and go to sleep ─
don't throttle up since in sleep state ─
don't throttle up since not most recently instructed to Xp ─
don't throttle up since not most recently instructed to Xp ─
throttle up because have more than D credits and most recently instructed to Xp ─
throttle down to Xp+1 because barely have D credits ─
throttle down to Xp because have less than D credits ─

MICROPROCESSOR THAT PERFORMS ADAPTIVE POWER THROTTLING

CROSS REFERENCE TO RELATED APPLICATIONS

This application is a continuation of co-pending U.S. application Ser. No. 12/403,195, filed Mar. 12, 2009, which claims priority to Provisional Application No. 61/158,019, filed Mar. 6, 2009, each of which is incorporated by reference herein in its entirety for all purposes.

FIELD OF THE INVENTION

The present invention relates in general to the field of power consumption in microprocessors, and in particular, to performance optimization within power constraints.

BACKGROUND OF THE INVENTION

System manufacturers that integrate processors into their systems have various goals with respect to power consumption and thermal considerations. For example, the system manufacturer may want to advertise that their system can provide a minimum battery lifetime. The power consumption of the processor is a major determinant of the battery lifetime. For another example, the system manufacturer implements a particular thermal solution (e.g., heat sinks, fans, venting). Again, the power consumption of the processor is a major determinant of whether the thermal solution can keep the temperatures of various system components (e.g., keyboard, processor, chipset) below required tolerances.

In order to meet these goals, the system designer specifies to the processor designers a maximum power value that the processor is allowed to consume, referred to herein as P. For example, the value of P might be 8 Watts in a relatively low-power system, such as a hand-held device, PDA, or sub-notebook computer. In order to comply with the system manufacturer's requirement, the processor designer designs the processor to never operate above a performance point—generally speaking, a frequency/voltage combination—that would cause it to exceed the P value even if the workload placed on the processor by the currently running software application mix is at its highest.

However, depending upon the system configuration, such as the power settings chosen by the user, the operating system may command the processor to transition between running states and sleep states at different times, based on the workload of the currently executing software applications. For example, the operating system may command the processor to be in a sleep state 90% of the time and to operate in a running state only 10% of the time. In such situations, the processor consumes significantly less than the P value specified by the system manufacturer. For example, the processor may consume at a rate of 1.2 Watts while in a sleeping state rather than the maximum 8 Watts specified by the system manufacturer, and even in the running state the processor may consume power at a rate of less than the maximum 8 Watts, depending upon the workload imposed by the software.

BRIEF SUMMARY OF INVENTION

In one aspect the present invention provides a microprocessor that performs adaptive power throttling. The microprocessor includes a calculation unit configured to calculate an average power consumed by the microprocessor over a most recent predetermined sample time and to determine whether the average power is less than a predetermined maximum power value. The microprocessor also includes a power management unit, coupled to the calculation unit, configured to control the microprocessor to conditionally operate at a predetermined frequency if the average power is less than the predetermined maximum power value. The predetermined frequency is a frequency at which the microprocessor may consume more than the predetermined maximum power value. The power management unit is configured to control the microprocessor to operate at the predetermined frequency only if the microprocessor was most recently instructed by system software to operate at a highest frequency instructable by the system software. The highest frequency instructable by the system software is less than the predetermined frequency.

In another aspect the present invention provides a method for performing adaptive power throttling in a microprocessor. The method includes calculating an average power consumed by the microprocessor over a most recent predetermined sample time. The method also includes determining whether the average power is less than a predetermined maximum power value. The method also includes conditionally operating the microprocessor at a predetermined frequency if the average power is less than the predetermined maximum power value, wherein the predetermined frequency is a frequency at which the microprocessor may consume more than the predetermined maximum power value. Conditionally operating the microprocessor at the predetermined frequency comprises operating the microprocessor at the predetermined frequency only if the microprocessor was most recently instructed by system software to operate at a highest frequency instructable by the system software. The highest frequency instructable by the system software is less than the predetermined frequency.

In yet another aspect the present invention provides a computer program product for use with a computing device, the computer program product comprising a computer usable storage medium having computer readable program code embodied in the medium for specifying a microprocessor. The computer readable program code includes first program code for specifying a calculation unit configured to calculate an average power consumed by the microprocessor over a most recent predetermined sample time, and to determine whether the average power is less than a predetermined maximum power value. The computer readable program code also includes second program code for specifying a power management unit, coupled to the calculation unit, configured to control the microprocessor to conditionally operate at a predetermined frequency if the average power is less than the predetermined maximum power value. The predetermined frequency is a frequency at which the microprocessor may consume more than the predetermined maximum power value. The power management unit is configured to control the microprocessor to operate at the predetermined frequency only if the microprocessor was most recently instructed by system software to operate at a highest frequency instructable by the system software, wherein the highest frequency instructable by the system software is less than the predetermined frequency.

An advantage of the present invention is that it performs adaptive power throttling to increase the performance of the microprocessor, when possible, and still maintain an average power consumption over the prescribed sample time that is less than the prescribed maximum power amount.

DETAILED DESCRIPTION OF THE INVENTION

Having made the above observation that the processor may be underutilized in some situations due to the maximum power consumption restriction placed upon the processor by the system manufacturer, the present inventors have devised a processor and method that tracks the power consumption of the processor over a sample time, and if the processor is consuming power at less than P, and if the processor deems it advantageous, the processor is allowed to operate at higher performance points than the performance point at which the processor consumes as much power as P, which for brevity is denoted herein as Xp. In addition to the P value, the processor designers obtain from the system manufacturers for each system a sample time value, T, over which the processor must insure that it consumes no more than P such that the system manufacturer can still meet its power consumption and/or thermal design goals. (For example, the value of T may be 1 millisecond for one system and it may be 1 second for another system, depending upon the design goals.) This enables the processor, in many situations, to operate at performance points that may consume power at more than P for some subset of T, as long as the processor insures that the average power consumption over T does not exceed P. This potentially provides the user with higher performance if the user needs it.

For example, assume during a given sample time the mix of currently running software applications allows for the operating system to command the processor to enter a sleep state (e.g., C-state 4) that consumes relatively low power during an aggregate of 40% of the sample time and to enter a running state (e.g., P-state 0) during an aggregate of 60% of the sample time. Embodiments are described herein that take advantage of this situation by operating the processor at a performance point at which the processor potentially consumes more than P (e.g., 16 Watts) and which performs higher than Xp (the performance point at which the processor consumes nor more than P), during some portion, if not all, of the 60% of the sample time that the processor is in the running state. However, the processor insures that the average power consumed during the sample time still does not exceed P.

To accomplish the performance gain, the processor maintains a value, referred to herein as A, which is a running average of the power consumed over the immediately previous sample time T. Each time the operating system commands the processor to transition from a sleep state to a running state, the processor compares A with P, and if A is less than P, the processor conditionally sets the performance point above Xp (that is, if the processor deems it advantageous to do so, e.g., if A is less than P by a threshold amount thus providing hysteresis to avoid frequent transitions to and from performance points above Xp, or the system software has placed the processor into the highest running state or in some other fashion determined that the user desires a high level of performance, and so forth, or a combination thereof); otherwise, the processor conditionally sets the performance point to Xp. That is, to the extent that A is less than P, the processor may be said to have built up "credits" that enable it to operate for a while at a performance point above Xp.

In one embodiment, the processor includes a counter that is used to maintain A. The processor increments the counter each clock cycle by a current increment value, I, that is based on the amount of power the processor consumes at its current performance point. In particular, in response to events that changes the processor's performance point, i.e., that change the power consumption of the processor in some fashion, the processor updates the current I value. In one embodiment, the processor includes a table that specifies a different I value for each performance point (e.g., each C-state and P-state). The I value for Xp would be approximately the quotient of P divided by the number of clock periods in the sample time T, the I values for performance points above Xp would be less than the I value for Xp, and the I values for performance points below Xp would be greater than the I value for Xp. In one embodiment, microcode is aware of each event that changes the processor's performance point and updates the I value accordingly.

The processor may perform the calculation of the difference between A and P, or an equivalent representation thereof, in various fashions. In one embodiment, microcode conceptually evenly divides the sample time T into N bins (e.g., 10) such that the duration of each bin is T/N. The microcode maintains a circular queue of the power consumed during each of the last N bins. At the beginning of a new bin time, the microcode pushes the current counter value into the tail end of the circular queue, and clears the counter to zero. The microcode then calculates A as the sum of the N bin values in the circular queue, i.e., the power consumed during the last N bin durations. The microcode then compares A to P (or some scaled value of P) and conditionally sets the performance point above Xp if the A value is less than the P value.

In one embodiment, the system manufacturer may dynamically specify the sample time T value to the processor depending on the thermal behavior the system manufacturer is attempting to control (e.g., keyboard, processor, chipset temperature) and/or based on other information that the system gathers, such as dynamically measured temperature or battery consumption values. The system manufacturer may do so either by using a device driver in the operating system, or through the system BIOS, using the Advanced Configuration and Power Interface (ACPI), for example.

Figure 1:
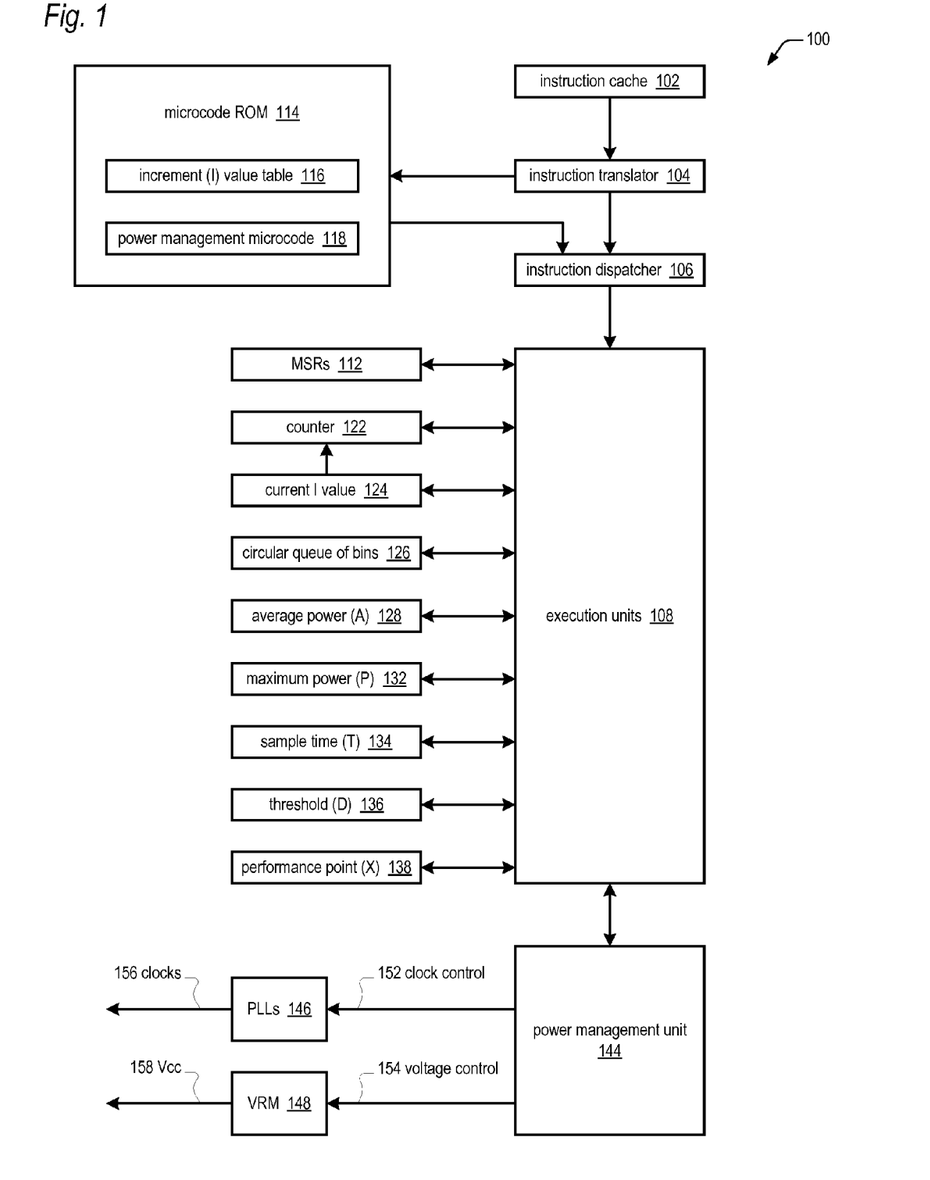
FIG. 1 is a block diagram of a microprocessor according to the present invention.

Referring now to FIG. 1, a block diagram of a microprocessor 100 according to the present invention is shown. The microprocessor 100 includes an instruction cache 102 for caching instructions received from a system memory (not shown) of the system (now shown) in which the microprocessor 100 operates. The instructions cached within the instruction cache 102 may include, among others, instructions for programming the microprocessor 100 with a maximum power (P) value 132, a sample time (T) 134, and a performance point (X) 138 of the microprocessor 100, which are discussed below in more detail. The instructions cached within the instruction cache 102 may also include instructions configured to program model-specific registers (MSRs) 112 of the microprocessor 100. In one embodiment, the MSRs 112 are the means by which system software, such as the operating system or BIOS, programs the P value 132, T value 134, and a performance point 138 into the microprocessor 100. In one embodiment, the macroarchitecture of the microprocessor 100 is an IA-32 macroarchitecture (also referred to as the x86 architecture). A microprocessor has an IA-32 macroarchitecture if it can correctly execute a majority of the application programs that are designed to be executed on an IA-32 microprocessor. An application program is correctly executed if its expected results are obtained.

The microprocessor 100 also includes a microcode ROM 114 that stores microcode instructions of microcode routines. The microcode ROM 114 microcode routines include power management routines 118. In one embodiment, the microprocessor 100 executes the power management routines 118 to control the adaptive power throttling described herein. Additionally, the microcode ROM 114 includes an I value table 116 that stores increment (I) values for the various performance points at which the microprocessor 100 runs or sleeps. The power management routines 118 utilize the I value table 116 to perform the adaptive power throttling described herein. The I value table 116 is described in more detail below with respect to FIG. 2. Additionally, the microcode ROM 114 includes microcode routines that implement special instructions of the microprocessor 100 instruction set, such as instructions that read or write the MSRs 112, such as x86 RDMSR and WRMSR instructions. The microcode routines may implement these special instructions. The system software executes some of the special instructions to program the microprocessor 100 into a particular performance point 138.

The microprocessor 100 also includes an instruction translator 104 that is coupled to receive instructions from the instruction cache 102. The instruction translator 104 decodes the instructions. In one embodiment, the instructions are macroinstructions, such as x86 architecture macroinstructions, and the instruction translator 104 translates the macroinstructions into microinstructions of the microinstruction set of the microprocessor 100 that are executed by execution units 108. When the instruction translator 104 decodes a complex instruction that is implemented by microcode, the instruction translator 104 suspends translating instructions from the instruction cache 102 and transfers control to an address within the microcode ROM 114 at which the appropriate microcode routine resides.

The microprocessor 100 also includes an instruction dispatcher 106 that is coupled to receive instructions from the instruction translator 104 and from the microcode ROM 114. The instruction dispatcher 106 dispatches instructions to the execution units 108 as their source operands and the execution units 108 become available.

The execution units 108 include various functional units to execute instructions, such as integer units, floating point units, MMX units, SSE units, branch units, load units, store units, and the like. The execution units 108 execute program instructions received from the instruction dispatcher 106. Among other things, the execution units 108 include calculation units that calculate the average power (A) 128 consumed by the microprocessor 100 during the sample time (T) 134, and compare the average power (A) 128 consumed with the maximum power (P) value 132. In one embodiment, the calculation unit compares the average power consumed with the maximum power (P) value 132 relative to a threshold value (D) 136. The MSRs 112 and storage for the average power (A) 128, maximum power (P) 132, sample time (T) 134, and threshold (D) 136 are coupled to the execution units 108. Also coupled to the execution units 108 are a counter 122 and storage for a current I value 124 and a circular queue of bins 126.

The counter 122 is incremented each clock cycle by the current I value 124. The current I value 124 is populated from the I value table 116, as described below. The microprocessor 100 increments the counter 122 each clock cycle, regardless of whether the microprocessor 100 is in a running state or in a sleep state. In one embodiment, the microprocessor 100 includes a free running oscillator that is used to increment the counter 122 even in sleep states in which the other clocks in the microprocessor 100 are disabled.

In one embodiment, the microprocessor 100 logically divides up the sample time (T) 134 evenly into sub-periods or sub-times, referred to herein as bin durations, depending on the number of bins in the circular queue of bins 126. Thus, for example, if the sample time (T) 134 is 1 millisecond and there are 10 bins, then each bin duration is 100 microseconds. At the end of each bin duration, the microprocessor 100 pushes the current counter 122 value into the bin at the tail of the circular queue of bins 126 and clears the counter 122, as discussed in more detail below.

The microprocessor 100 also includes one or more phase-locked-loop (PLL) circuits 146 that supply the clock signals 156 to the various portions of the microprocessor 100. The frequency of the clock signals 156 output by the PLLs 146 is a function of the input clock (not shown) frequency and a clock control signal 152. In one embodiment, the frequency of the clock signals 156 is a multiple of the input clock frequency, and the clock control signal 152 specifies the multiplier value, or ratio.

The system also includes a voltage regulator module (VRM) 148 coupled to the microprocessor 100 that provides the voltage (Vcc) 158 to the various portions of the microprocessor 100. The voltage 158 output by the VRM 148 is controlled by a voltage control signal 154.

The microprocessor 100 also includes a power management unit 144 coupled to the execution units 108. The power management unit 144 generates the clock control signal 152 and the voltage control signal 154 in response to control signals from the execution units 108.

Figure 2:
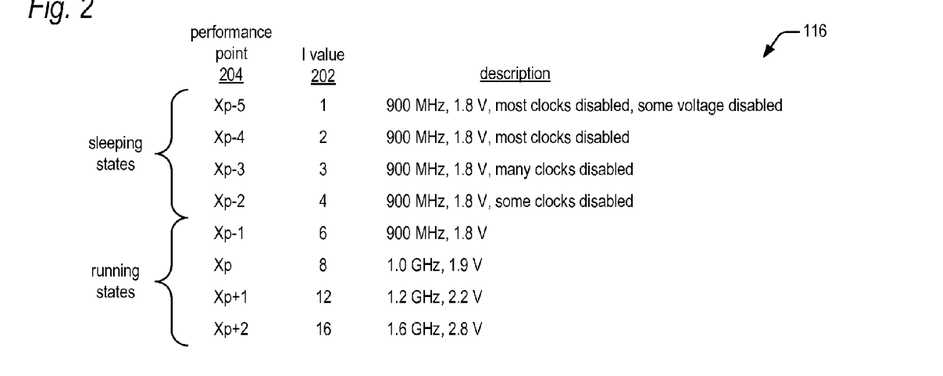
FIG. 2 is an illustration of an increment (I) value table of FIG. 1 according to the present invention.

Referring now to FIG. 2, an illustration of an I value table 116 of FIG. 1 according to the present invention is shown. The I value table 116 includes a plurality of entries corresponding to a plurality of performance points 204, referred to herein as Xn. In particular, the performance point 204 at which the microprocessor 100 consumes as much as P, is referred to herein as Xp. Performance points 204 at which the microprocessor 100 may consume above Xp are referred to as Xp+n, and performance 204 points at which the microprocessor 100 will consume less than Xp are referred to as Xp−n.

A performance point is a set of operating characteristics that define a maximum power the microprocessor 100 is capable of consuming when operating with the set of characteristics. The characteristics having the greatest impact on performance are operating frequency and voltage. However, other characteristics may be included. Another characteristic that may determine a performance point is whether any portions of the microprocessor 100 are disabled, and if so, which portions. For example, the microprocessor 100 may disable one or more of the execution units 108, instruction dispatcher 106, instruction translator 104, instruction cache 102, microcode ROM 114, data caches (not shown), or other functional units, or sub-portions thereof, in order to reduce power consumption. Furthermore, the manner in which the microprocessor 100 disables the portions may determine a performance point. In one embodiment, the microprocessor 100 disables a portion by not providing the clock signals to it. In one embodiment, the microprocessor 100 disables a portion by not providing voltage and clock signals to it. Additionally, temperature, workload, and the leakage current experienced by the microprocessor 100 may affect the amount of power consumed. The illustrative example shown in FIG. 2 takes into account frequency, voltage, clock disabling, and voltage disabling. However, other embodiments are contemplated in which other characteristics are considered in defining the performance points.

In one embodiment, the performance points 204 encompass the well-known P-states and C-states, the latter of which are commonly referred to as power states. C0 is the running C-state, and the other C-states are halted or sleeping states in which the clocks may be disabled in varying degrees from portions of the microprocessor 100 to reduce power consumption. When the microprocessor 100 is in C0 power state, the system software may program it to any of the P-states. Stated alternatively, the P-state is irrelevant in any C-state except C0. P0 is the highest performance P-state, P1 is the next highest performance state, and so forth.

As an illustrative example, table 116 of FIG. 2 includes eight entries for eight different performance points 204, denoted Xp−5 through Xp+2. Xp+2 is a performance point in which the microprocessor 100 is running at 1.6 GHz and operating at 2.8V. Xp+1 is a performance point in which the microprocessor 100 is running at 1.2 GHz and operating at 2.2V. Xp is a performance point in which the microprocessor 100 is running at 1.0 GHz and operating at 1.9V. Xp−1 is a performance point in which the microprocessor 100 is running at 900 MHz and operating at 1.8V. Xp−1 is a performance point in which the microprocessor 100 is running at 900 MHz and operating at 1.8V. Xp−2 is a performance point in which the microprocessor 100 is running at 900 MHz and operating at 1.8V and the clock signals to some portions of the microprocessor 100 are disabled. Xp−3 is a performance point in which the microprocessor 100 is running at 900 MHz and operating at 1.8V and the clock signals to many portions of the microprocessor 100 are disabled. Xp−4 is a performance point in which the microprocessor 100 is running at 900 MHz and operating at 1.8V and the clock signals to most portions of the microprocessor 100 are disabled. Xp−5 is a performance point in which the microprocessor 100 is running at 900 MHz and operating at 1.8V and the clock signals to most portions of the microprocessor 100 are disabled, and the voltage is disabled to some portions of the microprocessor 100 (e.g., cache memories).

Performance points Xp−2 through Xp−5 are sleeping states, whereas performance points Xp−1 through Xp+2 are running states. As shown, in the embodiment of FIG. 2, there are two X values above Xp, such that the processor may chooses the Xp+2 value if the difference between A and P is relatively large and choose the Xp+1 value if the difference between A and P is relatively small.

Each entry in the I value table 116 includes an increment (I) value 202 for its corresponding performance point 204. In one embodiment, the I values are formulated based on the maximum power that the microprocessor 100 could consume at the performance point (e.g., at a maximum software workload and worst case temperature).

In one embodiment, the I values 202 for sleep states are formulated based on a conservative estimate of the power that may be consumed during a tenancy in the sleep state. For example, when the system software places the microprocessor 100 into a sleep state, although the frequency may be changed quickly, the voltage may droop down from its present level to its sleep state level relatively slowly. Hence, the fall time associated with the droop may be relatively lengthy and affect the amount of power consumed during the sleep state tenancy. It is possible, for example, that the system software may wake up the microprocessor 100 out of its sleep state before the voltage has fully dropped, in which case the average power consumed during that particular sleep state tenancy may be more than during a sleep state tenancy in which the voltage fully drops.

In one embodiment, because the clock period may vary depending upon the performance point (X) 138, the I values 202 in the table 116 are scaled based on the clock period of the performance point (X) 138. The values shown in table 116 are relative and unit-less values chosen for illustrative purposes.

Figure 3:
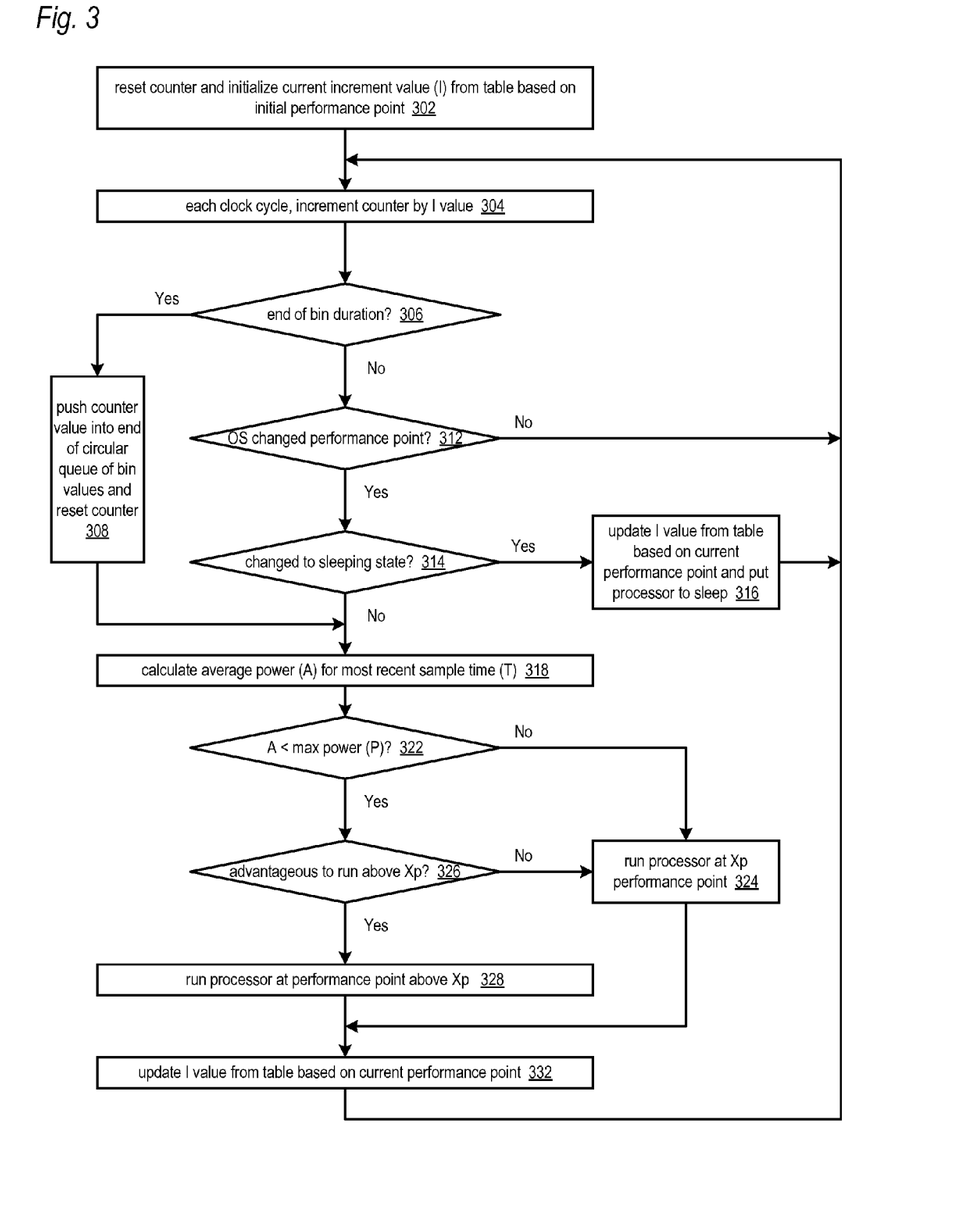
FIG. 3 is a flowchart illustrating operation of the microprocessor of FIG. 1 to perform adaptive power throttling according to an embodiment of the present invention.

Referring now to FIG. 3, a flowchart illustrating operation of the microprocessor 100 of FIG. 1 to perform adaptive power throttling according to an embodiment of the present invention is shown. Flow begins at block 302.

At block 302, the microprocessor 100 is reset, and as part of the boot sequence, the power management microcode 118 resets the counter 122 and initializes the current I value 124 from the I value table 116 of FIG. 1 based on the initial performance point of the microprocessor 100. Flow proceeds to block 304.

At block 304, each clock cycle the microprocessor 100 increments the counter 122 by the current I value 124. The incrementing of the counter 122 by the current I value 124 is performed by hardware, i.e., without involvement by the microcode 118. As described above, the microprocessor 100 increments the counter 122 each clock cycle, regardless of whether the microprocessor 100 is in a running state or in a sleeping state. Although FIG. 3 shows flow proceeding from block 304 to perform other operations, preferably the microprocessor 100 increments the counter 122 by the current I value 124 each clock cycle while it is performing other operations related to the adaptive power throttling described herein. Flow proceeds to decision block 306.

At decision block 306, the power management microcode 118 determines whether the end of a bin duration has occurred. In one embodiment, the microprocessor 100 takes an exception at the end of a bin duration, and the exception is handled by the power management microcode 118. In one embodiment, the exception is not taken if the microprocessor 100 is in a sleeping state, in which case the bin duration may be lengthened and taken into account by the power management microcode 118 during a subsequent calculation of A at block 318. If the end of a bin duration has not occurred, flow proceeds to decision block 312; otherwise, flow proceeds to block 308.

At block 308, the power management microcode 118 pushes the current value of the counter 122 into the end of the circular queue of bins 126 of FIG. 1 and resets the counter 122. Flow proceeds to block 318.

At decision block 312, the power management microcode 118 determines whether the system software has changed the performance point. In one embodiment, the system software changes the performance point by writing an MSR 122, which causes the power management microcode 118 to be invoked. If system software has not changed the performance point, flow returns to block 304; otherwise, flow proceeds to decision block 314.

At decision block 314, the power management microcode 118 determines whether the system software has changed the performance point to a sleeping state. If not, flow proceeds to decision block 318; otherwise, flow proceeds to block 316.

At block 316, the power management microcode 118 updates the current I value 124 from the I value table 116 based on the current performance point, and then puts the microprocessor 100 to sleep, e.g., puts the microprocessor 100 in the power state specified by the system software. In particular, the power management microcode 118 controls the power management unit 144 of FIG. 1 to control the PLLs 146 to set the requested operating frequency of the clocks 156 and to control the VRM 148 to set the requested Vcc 158 value. Flow returns to block 304.

At block 318, the power management microcode 118 calculates the average power consumed (A) 128 for the most recent sample time (T) 134. In one embodiment, the power management microcode 118 adds the values of all of the bins in the circular queue of bins 126 to calculate A 128. In one embodiment, if the power management microcode 118 is calculating the A value 128 in response to an event that causes a change in the performance point, such as the system software changing the performance point (for example, as determined at decision block 306), then the event most likely occurred in the midst of a bin duration. In this case, the power management microcode 118 multiplies the counter 122 value by the ratio of a bin duration to the time elapsed since the beginning of the current bin duration, and then pushes the multiplied value into the end of the circular queue of bins 126 and resets the counter 122 similar to the action performed at block 308, and then begins a new bin duration. In this embodiment, the time over which A 128 is calculated may be slightly less than the sample time 134, but still meets the requirements imposed by the system designer. Flow proceeds to decision block 322.

At decision block 322, the power management microcode 118 determines whether the average power consumed 128 during the most recent sample time 134 is less than the maximum power value (P) 132. In one embodiment, the average power 128 and the maximum power 132 are not true power values measured in Watts; rather, they are scaled values. That is, the compared value of P 132 may be a scaled version of the maximum power value specified by the system manufacturer, and the compared value of A 128 may be an equally scaled version of the true power consumed during the sample time 134, such that relative to one another the comparison serves the purpose of determining whether the microprocessor 100 has accumulated power "credits", so to speak, such that it may operate at a performance point above Xp. If so, flow proceeds to decision block 326; otherwise, flow proceeds to block 324.

At block 324, the power management microcode 118 controls the power management unit 144 to set the clock 156 frequency and operating voltage 158 to the values requested by the system software. Flow proceeds to block 332.

At decision block 326, the power management microcode 118 has determined at decision block 322 that it has accumulated power credits such that it may operate at a performance point above Xp. Nevertheless, the power management microcode 118 still conditionally operates at a performance point above Xp. That is, the power management microcode 118 determines whether it is advantageous to run the microprocessor 100 at a performance point that is above Xp taking other factors into account. In one embodiment, the power management microcode 118 determines it is advantageous only if the value of A 128 is sufficiently less than P 132 by the threshold amount (D) 136 of FIG. 1 to merit running above Xp. In one embodiment, the threshold value 136 is the maximum power the processor may consume in a bin duration. This insures that the average power consumed 128 during the sample time 134 does not exceed P 132 in the event that A 128 is just slightly below P 132. Additionally, employing the threshold value 136 may advantageously provide hysteresis to avoid frequent transitions to and from Xp. In one embodiment, the power management microcode 118 determines it is advantageous to run the microprocessor 100 at a performance point that is above Xp only if the system software has most recently instructed the microprocessor 100 to operate in the highest performance point known to the system software (e.g., P0 performance state). In one embodiment, the power management microcode 118 determines it is advantageous to run the microprocessor 100 at a performance point that is above Xp only if the system software has most recently not instructed the microprocessor 100 to operate in a sleeping state. If the power management microcode 118 determines it is not advantageous to run the microprocessor 100 at a performance point that is above Xp, flow proceeds to block 324; otherwise, flow proceeds to block 328.

At block 328, the power management microcode 118 controls the power management unit 144 to set the clock 156 frequency and operating voltage 158 to the values associated with a performance point that is above Xp, such as Xp+1 or Xp+2 of FIG. 2. In one embodiment, there may be multiple performance points 204 above Xp at which the microprocessor 100 may run, as shown in FIG. 2. The microprocessor 100 selects the appropriate performance point 204 based on the amount of the difference between P 132 and A 128. That is, if the difference is relatively small, then the microprocessor 100 may run at a performance point that is only slightly above Xp; however, if the difference is relatively large, then the microprocessor 100 may run at a performance point that is far above Xp. Thus, the microprocessor 100 advantageously performs adaptive power throttling to increase the performance of the microprocessor 100, when possible, and still maintain an average power consumption 128 over the prescribed sample time (T) 134 that is less than the prescribed maximum power amount 132. Flow proceeds to block 332.

At block 332, the power management microcode 118 updates the current I value 124 from the I value table 116 based on the current performance point. Flow returns to block 304.

In one embodiment, all the steps except the step at block 304 are performed only when the microprocessor 100 is in a running state, i.e., while the microprocessor 100 is capable of executing the power management microcode 118.

Figure 4:
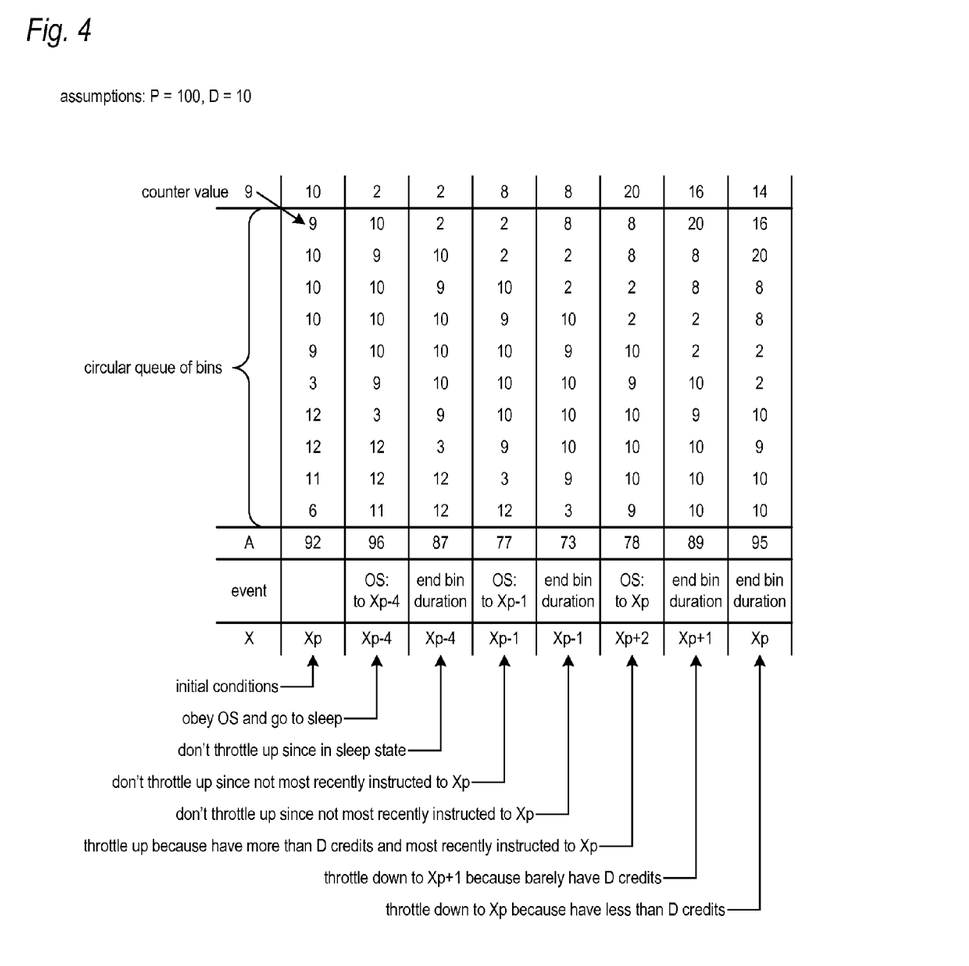
FIG. 4 is a timing chart illustrating an example of operation of the microprocessor of FIG. 1 to perform adaptive power throttling according to an embodiment of the present invention.

Referring now to FIG. 4, a timing chart illustrating an example of operation of the microprocessor 100 of FIG. 1 to perform adaptive power throttling according to an embodiment of the present invention is shown. For illustration purposes, the example assumes a value of maximum power P 132 equal to 100, value of threshold D 136 equal to 10, and the number of bins in the circular queue of bins 126 equal to 10. The chart includes a plurality of columns, each representing a different point in time at which an even occurs, and time progress from left to the right. Although the chart shows uniform columns, the amount of time between each column is not necessarily uniform; rather, the chart is merely intended to convey that the event in a given column occurs prior to the event in the column to its right. In the top row of the chart, the value of the counter 122 of FIG. 1 is shown at the time of each event.

In the next 10 rows, the value of each of the 10 bins is shown, with the oldest bin at the bottom. The values are not intended to be actual power values in Watts, but instead are a scaled representation of power consumed, and in one embodiment, may be on the order of tens of millions (rounded to one or two significant digits for illustration purposes). As shown, at each event the value in the counter 122 is pushed into the tail of the circular queue of bins 126 (and adjusted accordingly if necessary, as mentioned above with respect to block 318 of FIG. 3), and the oldest value in the bin at the head of the queue is pushed out.

In the next row, the average power consumed 128 during the most recent sample time (T) 134 is shown, which is the sum of the values in the circular queue of bins 126.

In the next row, the event is described, and in the bottom row the performance point (X) 138 is shown. In the first column, the initial conditions are shown, which are an A 128 value of 92 and an X 138 value of Xp.

In the second column, system software instructs the microprocessor 100 to transition to performance point Xp−4 (e.g., the well-known C3 power state). The microprocessor 100 responsively puts itself in the Xp−4 state.

In the third column, the end of a bin duration occurs. Although the A 128 value is 87 (i.e., it has 13 "credits", which is more than the threshold D 136), the microprocessor 100 refrains from throttling up to a performance point above Xp since the system software most recently instructed the microprocessor 100 to transition into a sleeping state.

In the fourth column, system software instructs the microprocessor 100 to transition to performance point Xp−1 (e.g., the well-known P1 performance state). Although the A 128 value is 77 (i.e., it has 23 "credits", which is more than the threshold D 136), the microprocessor 100 refrains from throttling up to a performance point above Xp since the system software did not most recently instructed the microprocessor 100 to transition to performance point Xp (e.g., the well-known P0 performance state), which is the highest performance point at which the system software is aware it may instruct the microprocessor 100 to operate. In one embodiment, the system software knows that at Xp the microprocessor 100 may consume up to the maximum power (P) 132 value specified by the system designer.

In the fifth column, the end of a bin duration occurs. Although the A 128 value is 73 (i.e., it has 27 "credits", which is more than the threshold D 136), again the microprocessor 100 refrains from throttling up to a performance point above Xp since the system software did not most recently instructed the microprocessor 100 to transition to performance point Xp.

In the sixth column, system software instructs the microprocessor 100 to transition to performance point Xp. The A 128 value is 78; therefore, the microprocessor 100 has 22 "credits", which is more than the threshold D 136. Additionally, the system software most recently instructed the microprocessor 100 to transition to performance point Xp. Therefore, advantageously, the microprocessor 100 throttles up to performance point Xp+2, its highest performance point.

In the seventh column, the end of a bin duration occurs. The A 128 value is 89; therefore, the microprocessor 100 has 11 "credits", which is more than the threshold D 136. Additionally, the system software most recently instructed the microprocessor 100 to transition to performance point Xp. Therefore, advantageously, the microprocessor 100 throttles to a performance point above Xp. However, since the number of credits is only slightly more than the threshold D value 136, the microprocessor 100 transitions to performance point Xp+1, which is above Xp.

In the eighth column, the end of a bin duration occurs. The A 128 value is 95; therefore, the microprocessor 100 has 5 "credits", which is less than the threshold D 136. Therefore, advantageously, the microprocessor 100 throttles to performance point Xp, to insure that it does not exceed the maximum power (P) value 132 specified by the system designer over the most recent sample time (T) 134.

Although embodiments have been described in which the adaptive power throttling is largely performed by microcode of the microprocessor, other embodiments are contemplated in which dedicated hardware or a combination of dedicated hardware and microcode perform the adaptive power throttling. Additionally, although embodiments have been described in which the average power consumed over the sample time is calculated using a table of increment values based on estimates of power consumption within a given performance point, other embodiments are contemplated in which other methods of estimating the average power consumption by the microprocessor over the prescribed sample time are used. For example, the microprocessor may directly measure the operating voltage, temperature, and current and compute the average power using these values. Furthermore, although an embodiment has been described that uses bin durations to calculate the average power consumed during the sample time, other embodiments are contemplated. For example, the power management unit may directly assess power consumed due to leakage current; the power management unit may interact with the VRM whereby the VRM establishes the average power; or the microprocessor may perform functional block-specific power estimation based on clock gating or other utilization.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the herein-described exemplary embodiments, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor that performs adaptive power throttling, comprising:
   a calculation unit, configured to calculate an average power consumed by the microprocessor over a most recent predetermined sample time, and to determine whether the average power is less than a predetermined maximum power value; and
   a power management unit, coupled to the calculation unit, configured to control the microprocessor to conditionally operate at a predetermined frequency if the average power is less than the predetermined maximum power value, wherein the predetermined frequency is a frequency at which the microprocessor may consume more than the predetermined maximum power value;
   wherein the power management unit is configured to control the microprocessor to operate at the predetermined frequency only if the microprocessor was most recently instructed by system software to operate at a highest frequency instructable by the system software, wherein the highest frequency instructable by the system software is less than the predetermined frequency.

2. The microprocessor of claim 1, wherein the predetermined maximum power value and the predetermined sample time are values specified to a designer of the microprocessor by a designer of a system in which the microprocessor is to operate in order to achieve a system design goal.

3. The microprocessor of claim 1, wherein the microprocessor is configured to receive the predetermined maximum power value from a system in which the microprocessor is operating.

4. The microprocessor of claim 1, wherein the microprocessor is configured to receive the predetermined sample time from a system in which the microprocessor is operating.

5. The microprocessor of claim 1, wherein the power management unit is configured to refrain from controlling the microprocessor to operate at the predetermined frequency if the microprocessor was most recently instructed to be in a sleeping state.

6. The microprocessor of claim 1, wherein the power management unit is further configured to control the microprocessor to conditionally operate at a second predetermined frequency if the average power is not less than the predetermined maximum power value, wherein the second predetermined frequency is a frequency at which the microprocessor may consume up to the predetermined maximum power value.

7. The microprocessor of claim 1, wherein the power management unit is configured to control the microprocessor to conditionally operate at a predetermined frequency if the average power is less than the predetermined maximum power value, in response to detecting that the microprocessor was instructed to operate at a new performance point.

8. The microprocessor of claim 1, wherein the calculation unit is configured to accumulate a plurality of average power values consumed by the microprocessor during a corresponding plurality of bin durations during the most recent predetermined sample time, wherein the plurality of bin durations comprise consecutive subsets of the most recent predetermined sample time, where in the calculation unit is further configured to calculate the average power consumed by the microprocessor over the most recent predetermined sample time based on the accumulated plurality of average power values.

9. The microprocessor of claim 8, where the power management unit is configured to control the microprocessor to conditionally operate at a predetermined frequency if the average power is less than the predetermined maximum power value, in response to detecting that a most recent of the plurality of bin durations has expired.

10. A method for performing adaptive power throttling in a microprocessor, the method comprising:
calculating an average power consumed by the microprocessor over a most recent predetermined sample time;
determining whether the average power is less than a predetermined maximum power value; and
conditionally operating the microprocessor at a predetermined frequency if the average power is less than the predetermined maximum power value, wherein the predetermined frequency is a frequency at which the microprocessor may consume more than the predetermined maximum power value;
wherein said conditionally operating the microprocessor at the predetermined frequency comprises operating the microprocessor at the predetermined frequency only if the microprocessor was most recently instructed by system software to operate at a highest frequency instructable by the system software, wherein the highest frequency instructable by the system software is less than the predetermined frequency.

11. The method of claim 10, wherein the predetermined maximum power value and the predetermined sample time are values specified to a designer of the microprocessor by a designer of a system in which the microprocessor is to operate in order to achieve a system design goal.

12. The method of claim 10, further comprising:
receiving the predetermined maximum power value from a system in which the microprocessor is operating, prior to said determining.

13. The method of claim 10, further comprising:
receiving the predetermined sample time from a system in which the microprocessor is operating, prior to said calculating.

14. The method of claim 10, wherein said conditionally operating the microprocessor at the predetermined frequency comprises refraining from operating the microprocessor at the predetermined frequency if the microprocessor was most recently instructed to be in a sleeping state.

15. The method of claim 10, further comprising:
conditionally operating the microprocessor at a second predetermined frequency if the average power is not less than the predetermined maximum power value, wherein the second predetermined frequency is a frequency at which the microprocessor may consume up to the predetermined maximum power value.

16. The method of claim 10, further comprising:
detecting that the microprocessor was instructed to operate at a new performance point;
wherein said conditionally operating is performed in response to said detecting.

17. The method of claim 10, further comprising:
accumulating a plurality of average power values consumed by the microprocessor during a corresponding plurality of bin durations during the most recent predetermined sample time, wherein the plurality of bin durations comprise consecutive subsets of the most recent predetermined sample time;
wherein said calculating the average power is performed based on the plurality of average power values consumed by the microprocessor during the corresponding plurality of bin durations during the most recent predetermined sample time.

18. The method of claim 17, further comprising:
detecting that a most recent of the plurality of bin durations has expired;
wherein said conditionally operating is performed in response to said detecting that the most recent bin duration has expired.

19. A computer program product for use with a computing device, the computer program product comprising:
a computer usable storage medium, having computer readable program code embodied in said medium, for specifying a microprocessor, the computer readable program code comprising:
first program code for specifying a calculation unit, configured to calculate an average power consumed by the microprocessor over a most recent predetermined sample time, and to determine whether the average power is less than a predetermined maximum power value; and
second program code for specifying a power management unit, coupled to said calculation unit, configured to control the microprocessor to conditionally operate at a predetermined frequency if the average power is less than the predetermined maximum power value, wherein the predetermined frequency is a frequency at which the microprocessor may consume more than the predetermined maximum power value;
wherein the power management unit is configured to control the microprocessor to operate at the predetermined frequency only if the microprocessor was most recently instructed by system software to operate at a highest frequency instructable by the system software, wherein the highest frequency instructable by the system software is less than the predetermined frequency.

20. The computer program product of claim 19, wherein the at least one computer readable storage medium is selected from the set of a disk, tape, or other magnetic, optical, or electronic storage medium and a network, wire line, wireless or other communications medium.

* * * * *